United States Patent [19]

Roeder

[11] 4,386,526

[45] Jun. 7, 1983

[54] METHOD FOR QUALITY CONTROL OF PROCESSES AND CONSTRUCTION COMPONENTS

[76] Inventor: Eckhard Roeder, Lesumer Heerstr. 5, 2820 Bremen 77, Fed. Rep. of Germany

[21] Appl. No.: 247,572

[22] Filed: Mar. 26, 1981

[30] Foreign Application Priority Data

Apr. 2, 1980 [DE] Fed. Rep. of Germany ....... 3012773

[51] Int. Cl.³ .......................................... G08B 21/00
[52] U.S. Cl. ........................................... 73/587; 73/660
[58] Field of Search ............... 73/587, 593, 659, 660; 324/679, 683

[56] References Cited

U.S. PATENT DOCUMENTS

| | | | |
|---|---|---|---|
| 3,745,815 | 7/1973 | Bentone et al. | 73/659 |
| 3,798,626 | 3/1974 | Weichbrodt | 73/660 |
| 3,913,084 | 10/1975 | Bollinger et al. | 73/660 |
| 3,979,739 | 9/1976 | Birchall | 73/660 |
| 4,006,625 | 2/1977 | Davis | 73/587 |

Primary Examiner—Howard A. Birmiel
Attorney, Agent, or Firm—Sughrue, Mion, Zinn, Macpeak and Seas

[57] ABSTRACT

A method for the quality control of processes and construction components by diagnosing their sound vibrations during a predetermined period of time. The invention has the purpose of objectively and reliably evaluating acoustic vibrations, independent of the subjective evaluation of monitoring personnel, which can also detect very fine differences in the vibration behavior of the monitored device at an early time. To this end, the invention provides two possible solutions. In one method according to the invention, the oscillation height ($\Delta A_1 \ldots \Delta A_n$) of the amplitudes of the signals are measured, depending upon a predetermined discharge time of an integrator (FIG. 1). In a second method, the impulse density of those impulses of the signal which exceed a predetermined threshold value (S) are measured.

8 Claims, 3 Drawing Figures

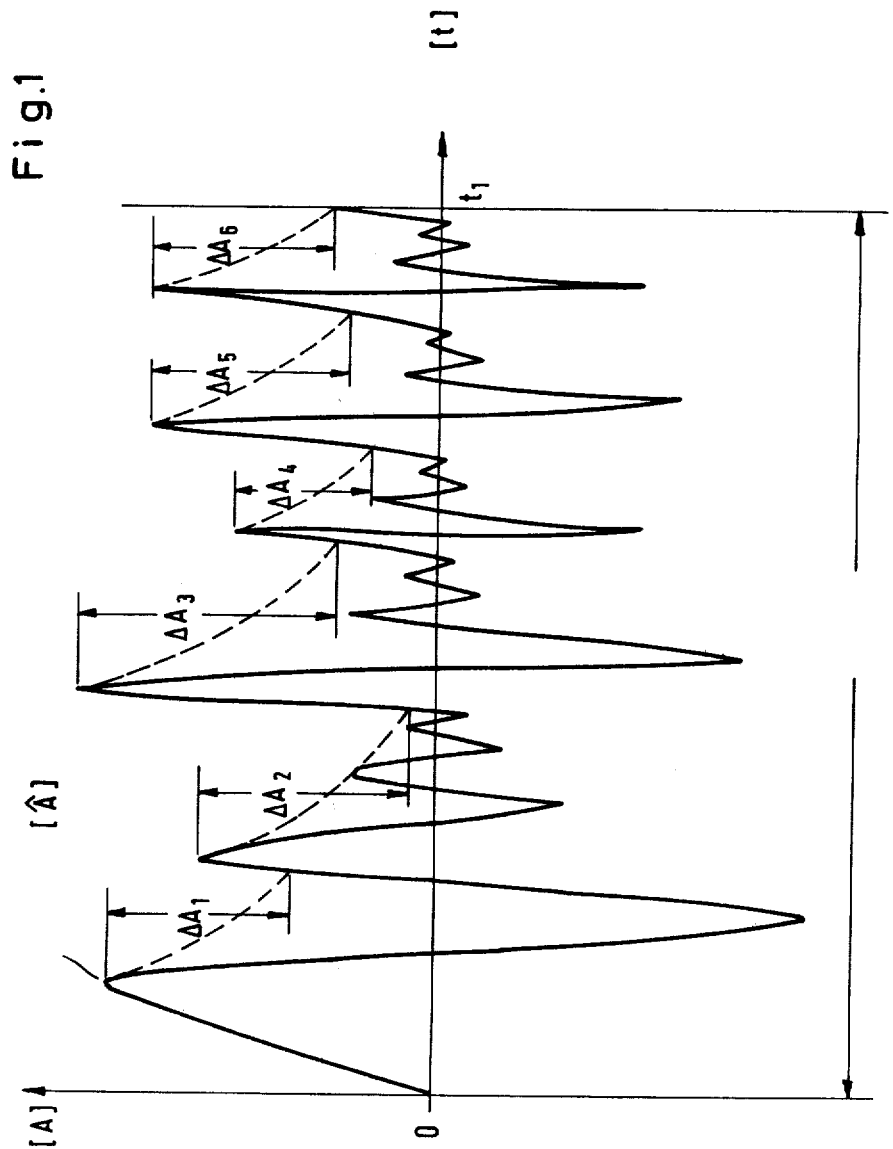

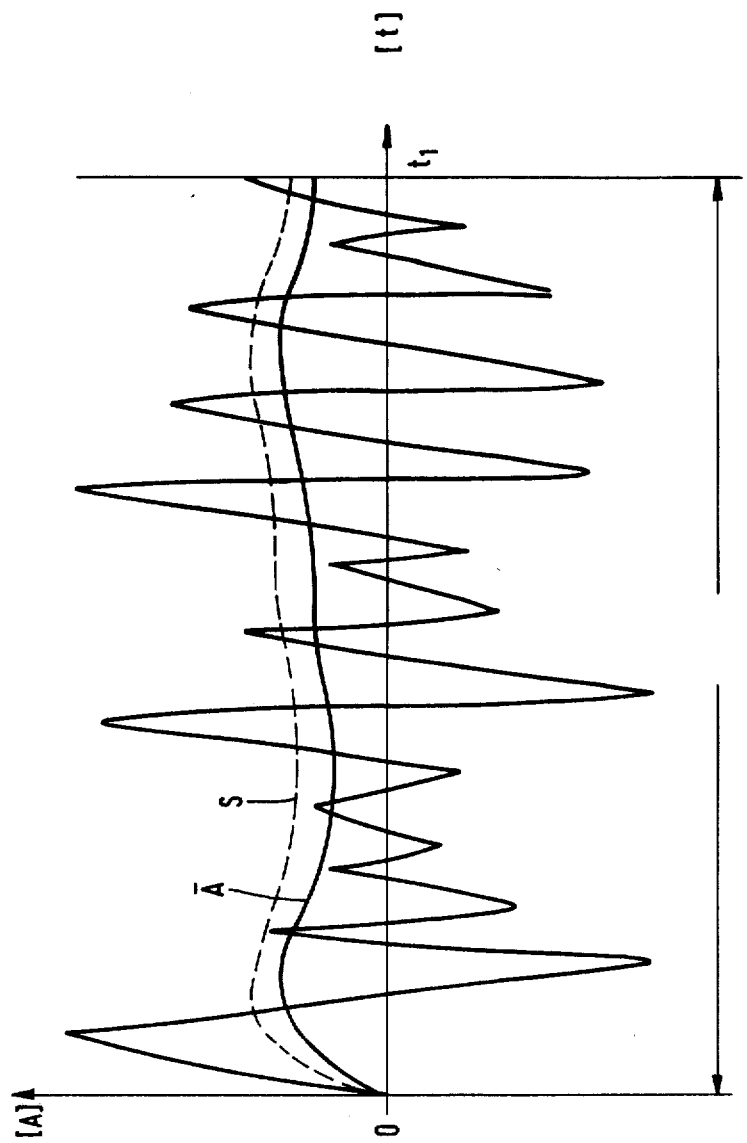

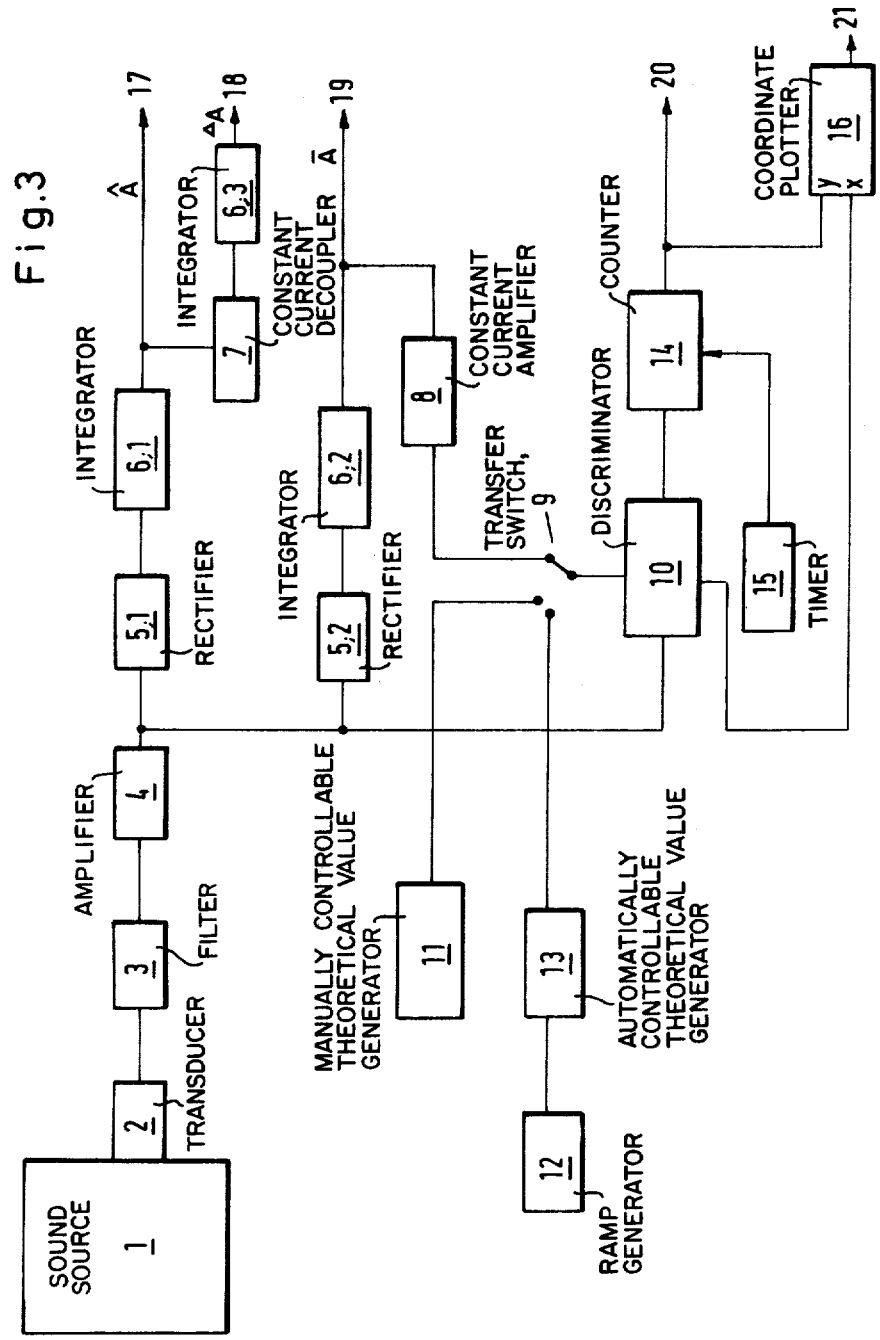

METHOD FOR QUALITY CONTROL OF PROCESSES AND CONSTRUCTION COMPONENTS

BACKGROUND OF THE INVENTION

The invention relates to a method for the quality control of processes and construction components, through a diagnosis of their sound oscillations during a predetermined time.

The invention is intended primarily for use in the field of quality control and monitoring of machines, motors, installations and production processes. Movements, and the friction associated therewith, as well as the contact of mechanical elements in technical processes cause noises and body conditions vibrations that are characteristic for the respective processes.

Any machine or technical process changes its characteristic vibration behavior as soon as a defect occurs. It is, therefore, important to detect such defects at an early stage in order to prevent damage, and to enable one to assess such vibratory changes objectively and correctly.

It is known that defects in machines and installations make their presence noticeable by a change in their characteristic sound and vibratory behavior. The movements in machines and in individual components of these machines send out characteristic body conduction vibrations which provide information about the movements. The vibrations are caused by the contact and friction of the individual machine elements during the machine's movements, and the spring/mass system associated therewith. If the friction or contact, respectively, changes due to defects such as impurities, mechanical damage, loose parts, varying production tolerances, material failure, etc., this in turn causes a change in the acoustic response.

These processes are monitored in many areas of technology by subjective human judgment. Evaluating a defect by way of air conduction, i.e., normal hearing, however, is insufficient. Therefore up until the present, numerous aids have been used to pick up the body conduction vibrations of a monitored machine, such as screw drivers or stethoscopes. Defects are occasionally attended by changes in body conduction vibrations that are audible to the human ear.

Known sound and vibration monitoring methods, as well as human detection, have been predominantly limited to measuring the ambient sound level and the characteristic frequencies of the sound. These sounds are generally picked up with microphones as airborne sound. Air sound measurements are very strongly subject, however, to environmental disturbance (background noise) and therefore can pick up defects in machines only if they produce vibrations which generate frequencies that can be transferred by the air. Thus, only very large changes in the noise and vibration characteristics of the machines can be detected, while fine differences, which make early detection possible, can not be so detected. Sound level measurement is a very strongly integrating method, in which brief vacillations, as found in technical processes, are largely suppressed.

With these methods, it is, therefore, possible to detect only those defects which occur constantly and regularly enough to raise the ambient sound level. Since changes in sound caused by machine defects can be very irregular depending on their cause, the use of frequency analyses to detect such irregular processes is likewise not suitable because, in general, such analyses are dependent upon uniform sound processes which generate characteristic frequencies. Moreover, the frequency analysis of body conduction vibrations is possible only when all conditions of the vibration system, particularly connecting the body conduction receiver, are held exactly constant. This is often extremely difficult under operating conditions.

Since the exact time at which damage will occur in machines cannot be predicted, it is necessary in many cases to constantly monitor the machines to make sure that defects are timely discovered. Therefore, it is desirable to automate the process of sound and vibration diagnosis in order to make it independent of subjective influence. With frequency spectral analyses, as were previously often carried out, this latter objective is still not possible, because the process produces a spectrum that must again be constantly monitored and subjectively interpreted.

SUMMARY OF THE INVENTION

The object of the present invention is to carry out an objective and reliable interpretation of machine vibrations, independent of the subjective evaluation of a human monitor, which can also detect very fine changes in the vibratory behavior of such machines at an early stage. The invention makes use of the fact that acoustical irregularities occur both as variations in amplitude and, as variations in time or rhythm.

The above objects is achieved, according to the invention, by measuring the height of the signal amplitude of signals picked up from a monitored machine in dependence upon the predetermined discharge time of an integrator.

According to a second method, the above object is achieved by measuring the impulse density of only those signal impulses which exceed a predetermined threshold. It is also advantageous, according to this second method, to control the height of the threshold automatically, depending upon the average amplitude of the signal oscillations.

To characterize the sound or vibration behavior of a machine at a defined point in time, the impulse density, which provides a direct measure of the rhythm of the sound, can be determined as a function of the amplitude of the sound in the form of an impulse density distribution.

It is, therefore, advantageous to construct the detection method such that the impulse density distribution is measured as an acoustic or vibration characteristic in a form in which the changes in the height of the threshold value, which must be exceeded by the impulses in order to be measured, is controlled automatically by a ramp generator, either continuously or in stages, and wherein each individual threshold height is represented as an x-coordinate, while the impulse density of the variations above the threshold are represented as y-coordinates in an x-y coordinate system.

One particular advantage of the method according to the invention rests in the fact that vibrations which are characteristic of sources of defects can be objectively and automatically monitored. In particular, the present invention achieves the following advantages:
  the correspondence between the vibratory behavior of a machine and its operating condition can be monitored in a fully automatic way
  the measured values are independent of the subjective influences of the monitoring personnel the monitoring is fully automated by the use of decision thresholds, and is divided into a production sequence the results of the monitoring are largely independent of variations in the measurement structure.

BRIEF DESCRIPTION OF THE DRAWINGS

To facilitate a better understanding of the present invention, reference is made to the several drawing figures, wherein:

FIGS. 1 and 2 each show the temporal progress of a measured signal, on which various measurement methods according to the invention are performed, FIG. 3 depicts a block diagram of a device for carrying out the method according to the invention.

DETAILED DESCRIPTION OF THE PREFERRED EMBODIMENT

Acoustical vibrations are picked up at a sound source 1, e.g. a monitored machine, by a measurement value pick up or transducer 2, and are converted into electrical signals. Of these signals, a filter 3 then selects frequency ranges which are amplified by an amplifier 4. A rectifier 5.1 and and integrator 6.1 each having a time constant of "one", provide the peak value $\bar{A}$ of the received signals. This output is indicated at 17 in FIG. 3. These peak values 17 are in turn applied to a constant current decoupler 7, and hence to an integrator 6.3 having a time constant of "three", in order to determine the oscillation height $\Delta A$ of the signals, independent of the absolute height of the signal. The output $\Delta A$ is indicated at 18 in FIG. 3, and individual $\Delta A$ values are indicated in FIG. 1.

The signal taken from amplifier 4 is also applied to a second rectifier 5.2 and an integrator 6.2 with a time constant of "two", and from this, the average amplitude $\bar{A}$ is determined, as illustrated at line 19. This average value is adjustably amplified in the constant current amplifier 8, and is output by way of a transfer switch 9 to a discriminator 10, which is the generator of threshold value S.

The signals output from amplifier 4 are simultaneously input directly to the discriminator 10, and only those impulse peaks which exceed the threshold value of S in the discriminator 10 are counted by a counter 14. To form the impulse density 20, the counter is controlled by a timer 15 which allows it to detect the impulses over a predetermined time.

Transfer switch 9 allows the control of the threshold value S and the discriminator 10 by enabling switching to the manually controllable theoretical value generator 11, and to the automatically controllable theoretical value generator 13. Both of the generators 11, 13 can be used to set the threshold value S which will trigger the discriminator 10. The value S, of course, is preferably set somewhat higher than the average amplitude $\bar{A}$ of line 19, as seen for example, in FIG. 2.

The automatically controllable theoretical value generator 13 is activated by a ramp generator 12, with which the threshold value S can be automatically adjusted from zero to a maximum value in discriminator 10, in order to obtain the impulse density distribution 21. The impulse density distribution 21 can then be depicted as a sound pattern by a coordinate plotter 16, in which the values from counter 14 are transferred onto the y-coordinates, and the height of the threshold S from discriminator 10 is depicted on the x-coordinate.

In use, the present invention is used to periodically sample the sound pattern generated by the monitored machine after various machine operation periods. As seen in FIG. 3, the sound pattern is analyzed in order to provide information regarding the sound pattern, such as the average amplitude thereof, etc., which can be recorded in any known fashion. By knowing the normal parameters of the sound pattern generated by the machine, any abnormal acoustic response can be readily detected, whereby the most sensitive differences in sound deviation can be automatically and graphically detected.

What is claimed is:

1. A method for testing a device which emits sound vibrations by producing and displaying signals representative of said sound vibrations occurring during a predetermined time period, comprising the steps of:

integrating said signal representative of said sound vibrations with first integrating means having a first time constant to produce a signal representative of peak values of said signal representative of said sound vibrations;

integrating said signal representative of peak values with second integrating means having a second time constant smaller than said first time constant to produce a signal representative of an oscillation height of said signal representative of said sound vibrations; and providing a visual display indicative of said signal representative of peak values and said signal representative of an oscillation height.

2. The method as claimed in claim 1, further comprising the steps of:

comparing said signal representative of said sound vibrations with a threshold value and outputting impulse peaks of said signal representative of said sound vibrations which exceed said threshold value;

counting said impulse peaks which exceed said threshold value; and providing an X-Y coordinate display wherein the result of said step of comparing is displayed on an X-coordinate and the result of said step of counting is displayed on a Y-coordinate.

3. The method as claimed in claim 2, further comprising the step of:

setting said threshold value in accordance with said average amplitude.

4. The method as claimed in claim 3, wherein said threshold value is less than said average amplitude.

5. The method as claimed in claim 2, further comprising the step of:

selectively setting said threshold value in accordance with a selected one of (1) said signal representative of an average amplitude, (2) a manually set value, and (3) a ramp waveform.

6. An apparatus for testing a device which emits sound vibrations by producing and displaying signals representative of said sound vibrations occurring during a predetermined time period comprising:

a transducer for producing said signal representative of said sound vibrations emitted from a device to be tested;

a filter for passing a selected frequency range of said signal representing said sound vibrations;

amplifying means for amplifying an output of said filter means;

a first rectifier having an input coupled to an output of said amplifying means;

first integrating means having a first time constant for integrating an output of said first rectifier, a signal representative of peak values of said signal representative of said sound vibrations being produced at an output of said first integrating means;

a constant current decoupler having an input coupled to said output of said first integrating means;

second integrating means having a second time constant greater than said first time constant for integrating an output of said constant current decoupler, a signal representative of an oscillation height of said signal representative of said sound vibrations being produced at an output of said second integrating means;

a second rectifier having an input coupled to an output of said amplifying means;

third integrating means having a third time constant intermediate said first and second time constants for integrating an output of said second rectifier, a signal representative of an average amplitude of said signal representative of said sound vibrations being produced at an output of said third integrating means;

discriminating means for passing to an output terminal impulse peaks of said signal representative of said sound vibrations which exceed a threshold value;

counting means having a signal input connected to said output terminal for counting impulse peaks of said signal representative of said sound vibrations which exceed said threshold value; and an X-Y coordinate plotter, an output of said counting means being applied to a Y-coordinate input of said coordinate plotter and said output terminal of said discriminating means being coupled to a X-coordinate input of said coordinate plotter.

7. The apparatus of claim 6, wherein said signal representative of said average amplitude is coupled to said discriminating means for setting said threshold value.

8. The apparatus of claim 7, further comprising;

a manually controllable theoretical value generator;

a ramp generator;

an automatically controllable threshold value generator operating in response to an output of said ramp generator; and a transfer switch for coupling to said discriminating means for setting said threshold value a selected one of (1) said signal representative of said average amplitude, (2) an output of said manually controllable theoretical value generator, and (3) an output of said automatically controllable threshold value generator.

* * * * *